United States Patent
Mourad et al.

(10) Patent No.: US 6,809,487 B2
(45) Date of Patent: Oct. 26, 2004

(54) CONTROL SYSTEM FOR A ROBOTIZED GEARBOX IN A MOTOR VEHICLE, WITH THE ABILITY TO LEARN THE POSITION OF THE RATIOS OR GEARS

(75) Inventors: Kamal Mourad, Turin (IT); Salvatore Melis, Rivoli (IT)

(73) Assignee: Sila Holding Industriale S.p.A., Turin (IT)

( * ) Notice: Subject to any disclaimer, the term of this patent is extended or adjusted under 35 U.S.C. 154(b) by 0 days.

(21) Appl. No.: 10/413,550

(22) Filed: Apr. 15, 2003

(65) Prior Publication Data

US 2004/0017169 A1 Jan. 29, 2004

(51) Int. Cl.$^7$ ................................................ H02P 1/00
(52) U.S. Cl. ........................ 318/268; 318/567; 318/564
(58) Field of Search ................................ 318/268, 567, 318/569, 12, 15; 180/312

(56) References Cited

U.S. PATENT DOCUMENTS 6,322,477 B1 * 11/2001 Eich et al. .................... 477/97
6,327,927 B1 * 12/2001 Rogg et al. .................... 74/335
6,364,294 B1 * 4/2002 Gennesseaux et al. . 267/140.13

* cited by examiner

Primary Examiner—Karen Masih
(74) Attorney, Agent, or Firm—Sughrue Mion, PLLC

(57) ABSTRACT

The system is operable to control a robotized gearbox which includes control levers which can be displaced along at least one working line along which a plurality of nominal operating positions are defined which correspond to the speed ratios or gears and to a neutral position. The control system includes electro-mechanical actuators coupled to the control levers and operable to displace them along the said at least one working line, and an electronic control unit operable to control these actuators to operate in a predetermined manner, so as to position the control levers selectively in one of the operating positions. The control levers have associated sensors operable to supply the control unit with signals which together indicate that the levers have reached predetermined positions along the said at least one operating line. The control unit is operable to carry out a process of learning and memorizing the actual engagement positions of the speed ratios or gears, which makes it possible to eliminate any operations for calibrating or adjusting the positions of the gears at the end of the assembly line.

6 Claims, 2 Drawing Sheets

CONTROL SYSTEM FOR A ROBOTIZED GEARBOX IN A MOTOR VEHICLE, WITH THE ABILITY TO LEARN THE POSITION OF THE RATIOS OR GEARS

The present invention relates to a control system for a robotized gearbox for a motor vehicle.

Gearboxes of this so-called "robotized" type make it possible, by means of electro-mechanical or electro-hydraulic devices, to change the transmission ratio of a conventional manual gear box for example of a type using gears, or to change the drive selection of an automatic gearbox.

Robotized gear boxes with electro-mechanical actuators have become more widely used recently, since they involve fewer installation problems and are competitive as far as costs are concerned when compared to gearboxes with electro-hydraulic devices.

Typically, the actuator devices used in a robotized gearbox of an electro-mechanical type include geared motors, comprising an electric motor and an associated reduction gear which could belong to one of several known types, involving a nut and screw, a rack or a cam, for example, for converting the relative movement of the output shaft of the associated motor into a linear motion. Such geared motors are coupled to control levers of the gearbox by motion transmission devices. Typically, the transmission devices which are used can be either of a type using a Bowden cable or one using a rigid rod. Such transmission devices make it possible to isolate the control electronics, thereby reducing the demands made on the electronics system, from the point of view of heat, mechanical vibrations and environmental protection.

The aforesaid actuators of an electro-mechanical type are typically controlled by Pulse-Width-Modulation (PWM) signals and must have a braking system, since the increased resistance of the cables between the electronics system and the actuator devices can make the motors brake less efficiently.

In the prior art, robotized gear boxes also include a certain number of sensors, for determining the absolute positions of the gear lever members required for scanning all the operating positions corresponding to the various speed ratios or gears.

In the case of a conventional mechanical gearbox, using gears, the gears are operated by two lever members. A first lever member, known as the selector member, is needed to choose or select the line or "plane" (selection plane) of the gear to be engaged, and a second lever member (known as the engagement lever) is provided actually to engage the chosen gear.

One problem which is encountered with robotized gearboxes relates to determining the effective engagement position of the various ratios or gears at the end of the production line. A gearbox normally has rather high mechanical tolerances, making it necessary, at the end of the assembly line, to carry out calibration and/or adjustment operations in order to determine the actual position of the various speed ratios or gears accurately.

These calibration and/or adjustment operations constitute a disadvantage.

One object of the present invention is to provide a control system for a robotized gearbox which overcomes this disadvantage.

This and other objects are achieved according to the invention by providing a control system for a robotized gearbox having the characteristics which are described in the appended Claim 1.

Further characteristics and advantages of the invention will become apparent from the detailed description which follows, provided purely by way of non-limitative example, with reference to the appended drawings, in which.

The description which follows describes an embodiment of a system according to the invention for a gearbox of a robotized type, in which the gearbox is of a conventional mechanical type using gears. It will be observed that the basic concepts of the invention are not limited to implementation in a control system for a gearbox of this type but can also be applied to controlling the change of driving mode in an automatic vehicle.

Figure 1:
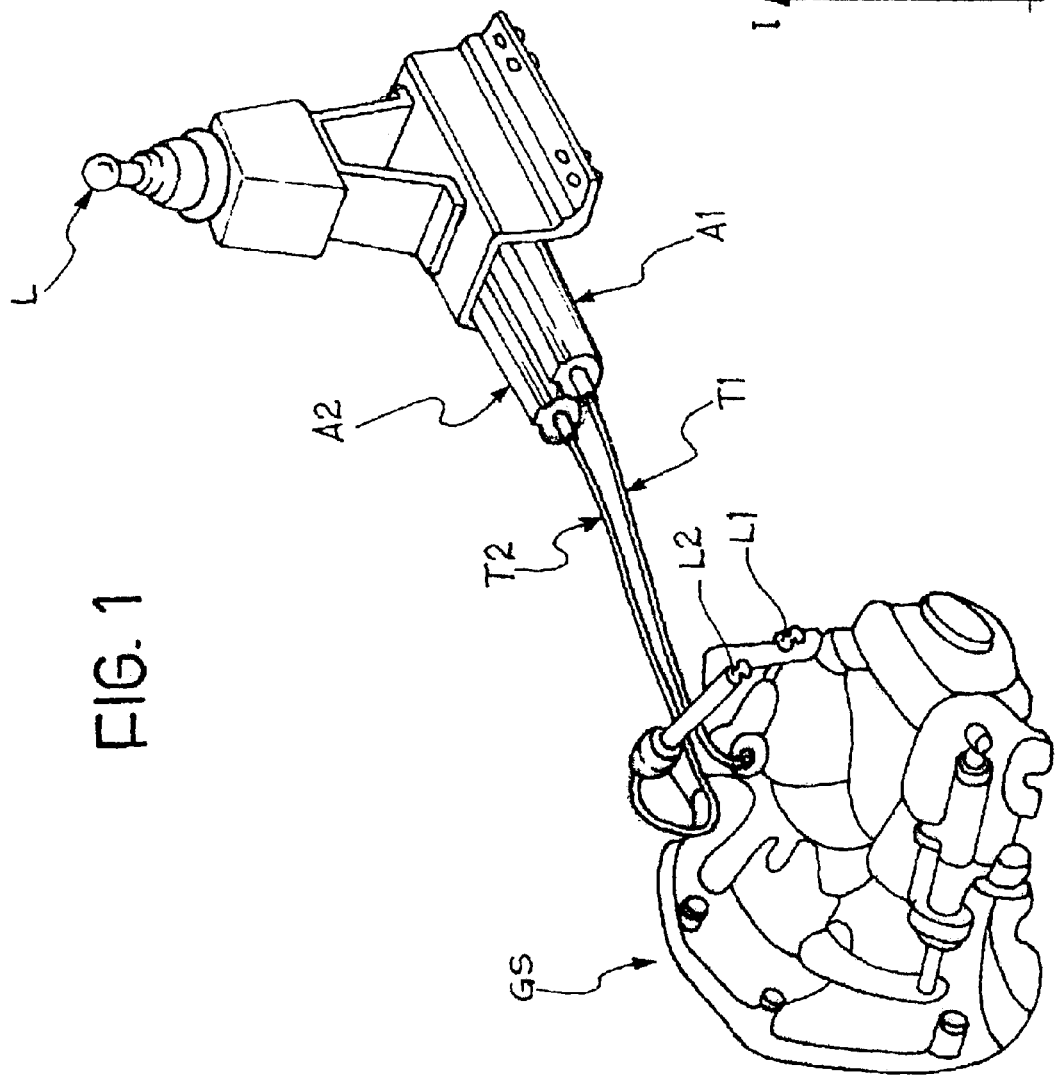
FIG. 1 is a perspective view of a gear box of a robotized type for a motor vehicle, with a control system according to the invention.

In FIG. 1, a mechanical gearbox for a motor vehicle (not illustrated) is generally indicated GS.

The gearbox GS is of a conventional type, operable to change through six forward speed ratios or gears and one ratio for reverse movement.

The gearbox GS is of a "robotized" type. It has an associated manual device, for example, for controlling the selection and engagement/disengagement of the various gears, such as the lever indicated L in FIG. 1. The lever L is of the type known as a joystick, for example, and position transducers are associated with it in a known manner, for supplying signals indicating the speed ratio or gear desired by the driver to an electronic control unit ECU (see FIG. 2). Instead of a single lever L, other devices which are known per se could be used to select and engage/disengage the speed ratios, such as pairs of levers mounted near the steering wheel, or push-buttons or the like.

The robotized gearbox could conceivably have no elements for the manual control of gear selection and engagement/disengagement, as it is possible for this to be controlled automatically by a control unit ECU on the basis of signals supplied to this unit, in a manner which is also known, by a plurality of sensors (not shown), with the robotized gearbox then behaving like an "automatic" gearbox.

Figure 2:
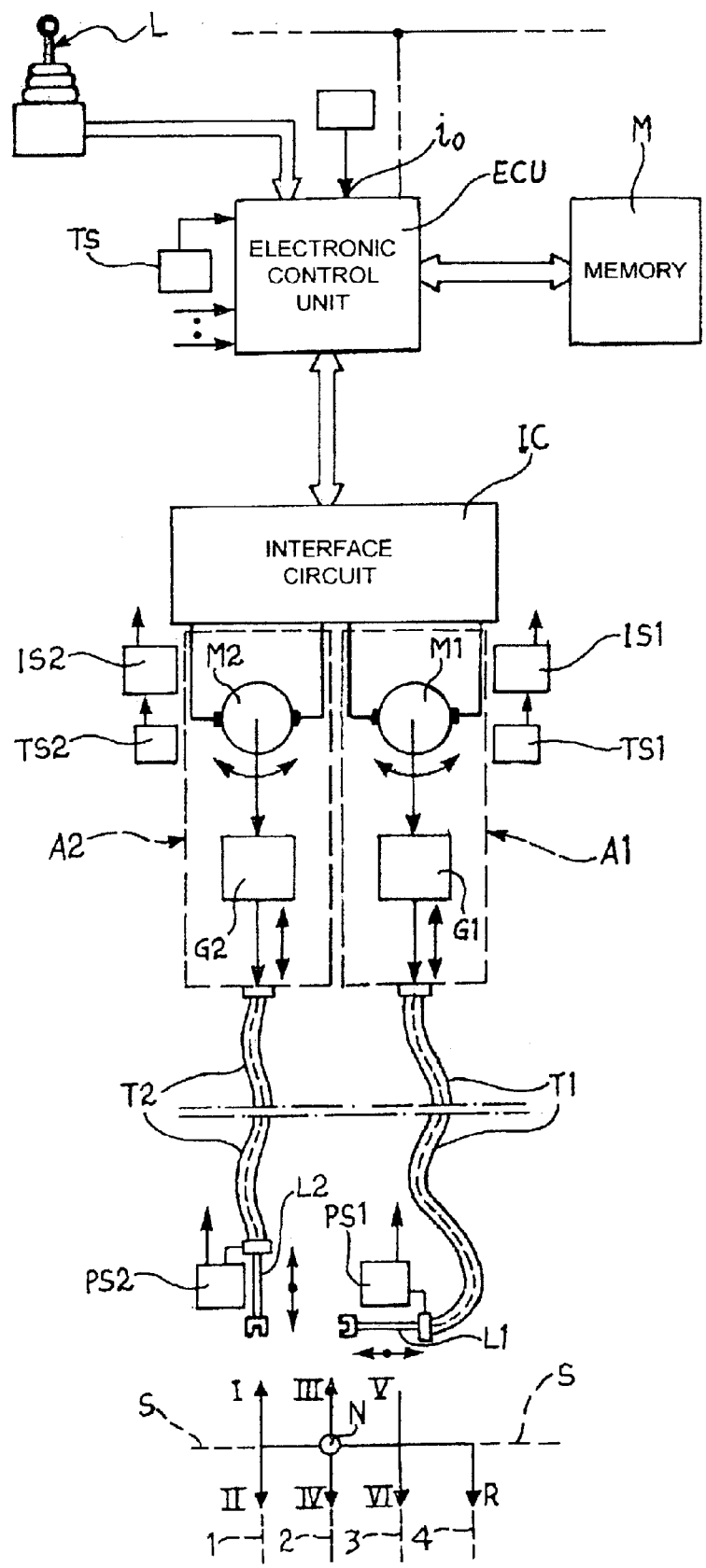
FIG. 2 is a diagram showing the structure of a control system of the invention associated with a gearbox of a robotized type.

The electronic control unit ECU is operable to control the selection and engagement/disengagement of the various gears by means of a pair of electro-mechanical motion actuator devices, indicated A1 and A2 respectively in FIG. 2, and controlled by interface circuits IC which are known per se.

In the embodiment illustrated, the actuator devices A1, A2 include respective DC electric motors M1, M2, in which the output shaft is coupled to a respective reduction gear/converter G1, G2, operable to convert the rotary motion of the output shaft of the associated motor into a bi-directional linear motion.

Respective electrical current sensors IS1 and IS2, or amperometric sensors and sensors TS1 and TS2 are associated with the motors M1, M2 for counting the number of revolutions (in unit time) and reporting the sense of rotation of the said electrical motors, or tachometer sensors, such as Hall effect sensors for example, connected to the electronic control unit ECU.

The actuator devices A1, A2 are coupled to corresponding lever control members L1 and L2 by means of respective transmission devices T1 and T2. In the example illustrated, these transmission devices include flexible cables such as Bowden cables.

In a manner known per se, the lever members L1 and L2 are translatable, by means of their associated actuator devices, along operating lines which form an angle to each other, referred to hereafter as the selection line and the engagement/disengagement line respectively.

In the diagram given in the lower portion of FIG. 2, the selection line is indicated S while the engagement/disengagement lines (or "planes") of the various speed ratios are indicated 1, 2, 3 and 4.

In this diagram, the engagement-disengagement line indicated 1 is the one associated with the speed ratios I and II, while the engagement/disengagement line 2 is associated with the speed ratios III and IV, line 3 is associated with the speed ratios V and VI while the engagement/disengagement line indicated 4 is associated with the reverse R.

In this diagram, N indicates the neutral position, which is usually found at the intersection between the selection line S and the engagement/disengagement line of the speed ratios III and IV, that is the line indicated 2 in FIG. 2.

In a manner known per se, respective electrical position sensors, indicated PS1 and PS2 in FIG. 2, are associated with the levers L1 and L2. These sensors are also connected to the electronic control unit ECU.

In normal operation, the electronic control unit ECU is set to control the actuators A1 and A2 according to predetermined parameters, so as to control the selective arrangement of the lever members L1 and L2 in the operating positions corresponding to the speed ratio or gear to be engaged.

Memory devices M, of a type known per se, are associated with the control unit ECU. These devices could be integrated into the control unit itself.

When the control system of the invention receives an appropriate control signal at one input $i_o$, the control unit ECU is set to carry out a process of learning and memorizing the actual engagement positions of the ratios or gears in a way which will now be described.

In this learning and memorization process, the unit ECU causes the controlled activation of the actuator devices A1 and A2, thereby causing the control levers L1 and L2 to move according to respective operating lines while, by means of the position sensors PS1, PS2, the current sensors IS1, IS2 and the tachometric sensors TS1, TS2 it detects and memorizes the actual positions of the said levers corresponding to the nominal operating positions, according to a method which will now be described, doing this independently of any mechanical tolerances and play in the gearbox with which the control system is specifically associated.

The process of learning and memorization of the actual engagement positions of the different speed ratios in the gearbox begins with the gearbox GS in the neutral position N.

At the start of the process, the control unit ECU first acquires and memorizes the neutral position N, on the basis of signals provided by the sensors PS1, PS2 and IS1, IS2.

Once this has been done, the control unit ECU activates the actuator A1, or selection actuator, thereby displacing the lever members L1, L2 along the selection line S as far as the end of stroke for each selection, it then acquires and memorizes these positions, again on the basis of signals supplied by the aforesaid sensors PS1 and IS1.

The end-of-stroke positions in particular can be determined on the basis of data supplied by the current sensors IS. In general, when the aforesaid levers L1, L2 reach an end-of-stroke position, the current consumed by the motors M of the associated actuator devices A shows a sudden and typical increase, caused by the fact that the motors are stalled.

Once the end of stroke selection positions have been acquired as well as that of neutral N, the control unit ECU is able to determine the positions along the selection line S of the lines or planes of engagement/disengagement 1–4.

In the embodiment illustrated with reference to FIG. 2, the position of the engagement/disengagement line 1 corresponds essentially to one end of the selection stroke, while the position of the engagement/disengagement line 2 corresponds essentially to the neutral position. The position of the engagement/disengagement line of the reverse gear R corresponds to the other end of the selection stroke.

The electronic control unit ECU can determine the position of the engagement/disengagement line 3, which corresponds to gears V and VI, on the basis of data which have already been memorized. In most gearboxes, the position of this engagement/disengagement line 3 is halfway between that of the engagement/disengagement lines 2 and 4.

Figure 3:
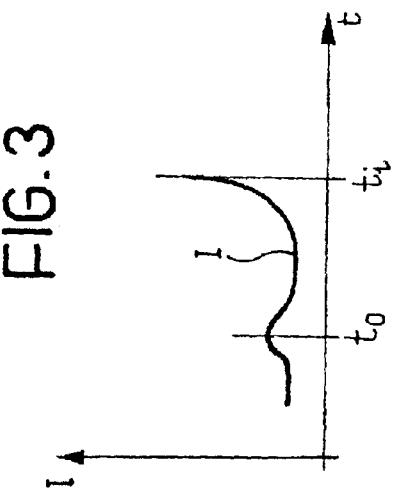
FIG. 3 is a graph illustrating an example of the pattern of the power absorbed by a gearbox actuator, as a function of the time t plotted on the abscissa.

The control unit ECU is also operable to activate the second actuator A2 or engagement/disengagement actuator, at each intersection of the selection line S with any engagement/disengagement line 1–4, in such a way as to displace the lever member L2 along the corresponding line 1–4 and to acquire and memorize the corresponding positions of commencement and completion of gear engagement, which correspond to the various speed ratios or gears. FIG. 3 shows the typical pattern of the current consumed by the motor M2 of the transducer A2 at the engagement of a gear, where the current peak at the instant $t_0$ is caused by the current required to force against and overcome the position-marker or position stabilizer spring which is arranged in conventional mechanical gearboxes. Once the instant $t_0$ is passed, one can be sure that the gear has been engaged. The signals emitted by the sensors PS2 and TS2 at the instant $t_0$ are then perceived as indicating the position of commencement of gear engagement. The signals supplied by the sensors PS2 and TS2 at the instant $t_i$ of FIG. 3, on the other hand, are perceived as indicating the end of stroke position of gear engagement (when the motor M2 stalls). In actual fact, when memorizing the final engagement positions of the various ratios or gears, the control unit ECU can memorize in advance predetermined positions spaced from the aforesaid end-of-stroke positions, thereby preventing the motor M2 of the associated engagement actuator A2 from stalling each time a gear is engaged.

The process of learning and memorizing the actual engagement positions of the speed ratios or gears could follow a different operating order from that described above. For example, the unit ECU could be set to carry out the learning and memorization process as follows.

The unit ECU first acquires the neutral position N. It then activates the selection actuator A1 so as to cause a movement along the selection line S, towards the reverse gear R. The unit ECU then determines and memorizes the selection end-of-stroke position along the selection line corresponding to the reverse gear R.

The unit ECU then activates the engagement actuator A2 along the engagement/disengagement line 4, in the direction corresponding to engagement of the reverse gear R. During this movement, the current consumed by the electric motor M2 increases at first in order to overcome the opposition to displacement of the lever L2 provided by the associated position-stabilizer spring device. The current measured by the sensor IS2 therefore shows a characteristic knee-shape pattern, as shown, for example at the instant $t_0$ in FIG. 3, after which it tends to diminish once the release of the spring of the position stabilizer device contributes to the movement of the lever L2. Once the end of stroke position corresponding to engagement of the reverse gear R has been reached, the current I consumed by the motor M2 increases sharply and characteristically, as shown at the instant $t_i$ of FIG. 3. On detecting this increase, the unit ECU registers that the end of stroke position corresponding to engagement of the reverse gear has been reached and memorizes it, along with the values provided by the tachometric sensor.

By means of the actuator A1, the unit ECU returns to the previously memorized neutral position N. Once this position is reached, the unit ECU activates the motor M1 of the selector actuator A1 so as to displace the levers L1, L2 along the selection line S towards the opposite end-of-stroke position to that corresponding to the reverse gear R. Once this end-of-stroke position is reached, as detected by the sudden increase in current consumed by the motor M1, the unit ECU memorizes the said end-of-stroke position, on the basis of which it can calculate the magnitude of the selection stroke.

In the said end-of-stroke position, the unit ECU activates the motor M2 of the engagement/disengagement actuator A2, so as to displace the lever L2 along the line 1, towards the engagement position of gear I (or of gear II) and then back towards the end of stroke position corresponding to gear II (or to gear I).

The unit ECU next repositions the levers in the neutral position N and in this position uses the motor M2 of the engagement/disengagement actuator A2 to detect the end-of-stroke positions along the engagement line 2, corresponding to the actual engagement positions of gears III and IV.

Next, once the intersection position of the selection line S and the engagement line 3 has been determined (in the way described above), by means of the actuator A2 the unit ECU determines the end-of-stroke positions for gears V and VI.

The positions detected by the sensors PS and TS are retained in the memory M during all subsequent activity relating to normal operation of the robotized gearbox, except for small changes carried out following self-adjustments of the system as part of its normal operation. During normal operation of the robotized gearbox, signals supplied by the sensors PS and TS for the various gears are compared with the values in the memory. Should the instantaneous value of the signals and those stored in the memory differ by more than a predetermined value, an automatic adjustment is set in motion to "track" the new position of the gears.

Once the geometry of the configuration of the speed ratios in the gearbox GS is known, the system described above makes it possible to create a full "map" of the gears or speed ratios, without requiring a calibration or adjustment at the end of the gearbox assembly line.

If the sensors PS1 and PS2 are mounted directly on the gearbox GS or on the end of the transmission cables T1 and T2 adjacent the gearbox, and if the temperature of the associated heat engine is known (this information is usually available on the vehicle's on-board communications network), the unit ECU can be used to implement different algorithms which make it possible to correct thermal drift in the said sensors. In addition, using a temperature sensor TS (see FIG. 2), of an NTC or PTC type for example, associated with the electronic control unit ECU, it is possible to compensate for any thermal drift in any electronic components and to install protection for power devices.

Naturally, the principle of the invention remaining unchanged, embodiments and manufacturing details may vary widely from those described and illustrated purely by way of non-limitative example, without departing thereby from the scope of the invention, as defined in the appended Claims.

What is claimed is:

1. A control system for a gearbox of a robotized type for a motor vehicle which includes lever control means displaceable along at least one working line along which a plurality of nominal operating positions are defined which correspond to the speed ratios or gears and to a neutral position;

the control system including
  electro-mechanical displacement actuator means coupled to the said lever control means and operable to displace them along at least one working line, and
  electronic control means for controlling the operation of the said actuator means according to a predetermined mode, so as to cause the said lever control means to be disposed selectively in one of the said operating positions;

the system also including
  sensor means associated with the said lever control means and operable to supply the electronic control means with signals which together indicate that the said lever control means have reached predetermined positions along the said at least one working line, and
  memory means associated with the said electronic control means;

the electronic control means being operable, when they receive an appropriate control signal, to carry out a process of learning and memorizing the actual positions of engagement of the ratios or gears, in which the said control means cause the controlled activation of the said actuator means, thereby causing controlled displacement of the said lever control means along the said at least one working line and, by means of the said sensor means and according to a predetermined method, based on measuring the current consumed by the actuator means, to detect and memorize the actual positions of the said lever control means corresponding to the said nominal operating positions.

2. A control system according to claim 1, for a robotized gearbox in which the aforesaid electro-mechanical displacement actuator means include electrical motor means coupled to the said lever control means, the aforesaid sensor means including
  sensor means for measuring the current consumed during operation by the electrical motor means,
  electrical sensor means for detecting the position of the said lever control means, and
  sensor means for measuring the speed of rotation of the said motor means.

3. A control system according to claim 1, for a mechanical gearbox of a type using gears, in which the lever control means include first and second levers, for the selection and engagement/disengagement respectively of the speed ratios or gears, associated respectively with first and second electro-mechanical actuators for displacing the levers along a first and at least one second working line respectively, these being a selection line and an engagement-disengagement line respectively forming an angle to each other;

the control means being operable to carry out the said learning and memorization process with the gearbox starting in its neutral position; this process comprising the steps of:

acquiring and memorizing the neutral position on the basis of signals supplied by the said sensor means;

activating the first, or selection actuator so as to displace the said lever members along the selection line to each end-of-stroke position, and acquiring and memorizing these positions;

determining, in a predetermined manner and in dependence on the distance between the said selection end-of-stroke position and the memorized neutral position, the position along the selection line of the planes or lines of engagement/disengagement of the speed rations or gears, on the basis of the geometry of the gearbox; and activating the second actuator, or engagement/disengagement actuator starting from each intersection of the selection line with an engagement/disengagement line or plane, so as to displace the second member or lever along the corresponding engagement/disengagement line or plane and acquire and memorize the corresponding positions at the commencement and completion of engagement of the speed ratio or gear.

4. A system according to claim 2, in which the said position sensor means are arranged near the gearbox, and in which the said control means are operable to implement algorithms for correcting any thermal drift of the said sensors means due to variations in the temperature of the engine with which the gearbox is associated.

5. A system according to claim 1, in which the said electronic control means have associated temperature sensor means and the said control means are operable to compensate for any thermal drift in the electronic components of the system and to protect electronic power components.

6. A system according to claim 1, in which, during normal operation of the robotized gearbox, the said electronic control means are operable to actuate algorithms for tracking the position of the gears.

* * * * *